United States Patent [19]

Stankewitsch

[11] Patent Number: 4,589,397
[45] Date of Patent: May 20, 1986

[54] APPARATUS FOR ADAPTING TO GASES OF DIFFERENT CALORIFIC VALUES IN THE SUPPLY OF GAS-AIR MIXTURE TO GAS ENGINES

[75] Inventor: Leo Stankewitsch, Ilvesheim, Fed. Rep. of Germany

[73] Assignee: Motoren-Werke Mannheim Aktiengesellschaft vorm, Benz Abt, stationärer Motorenbau, Mannheim, Fed. Rep. of Germany

[21] Appl. No.: 634,393

[22] Filed: Jul. 25, 1984

[30] Foreign Application Priority Data

Aug. 1, 1983 [DE] Fed. Rep. of Germany ....... 3327699

[51] Int. Cl.$^4$ ............................................. F02M 29/00
[52] U.S. Cl. .................................... 123/590; 123/527; 123/585; 48/189
[58] Field of Search ................... 123/590, 527, 276 E, 123/585; 48/189.3, 180.1

[56] References Cited

U.S. PATENT DOCUMENTS

| 2,315,882 | 4/1943 | Trimble | 123/527 |
| 3,846,094 | 11/1974 | Baverstock | 48/189.3 |
| 4,337,742 | 7/1982 | Carlson et al. | 123/585 |
| 4,377,147 | 3/1983 | Bergmann et al. | 123/527 |

FOREIGN PATENT DOCUMENTS 195852 12/1982 Japan .................................. 123/590

Primary Examiner—E. Rollins Cross
Attorney, Agent, or Firm—Browdy and Neimark

[57] ABSTRACT

An apparatus for adapting to gases of different calorific values in the supply of gas-air mixture to gaseous-fuel engines has a gas line with a gas pressure regulator and an air line, each of which discharged into a gas-air mixer. Leading out of the mixer is a mixture line, in which a mixture valve is disposed. The mixture line leads to the intake manifold of the gas engine. In order to be able to use gases of different calorific values without unfavorably varying the gas-air ratio in the partial-load range, a preferably adjustable throttle is disposed in a bypass line leading from the air line to the mixture line, bypassing the mixer.

4 Claims, 1 Drawing Figure

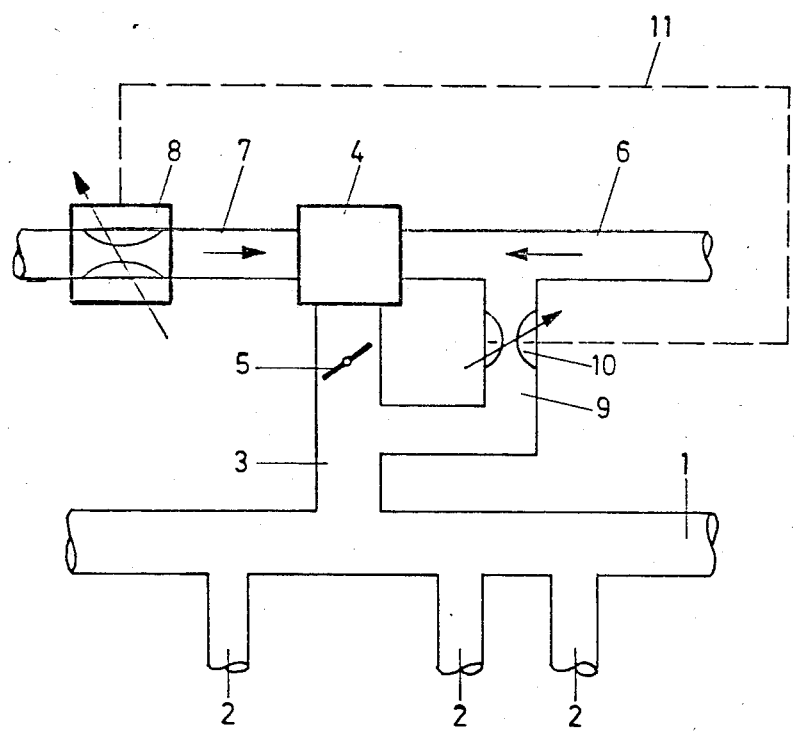

4,589,397

APPARATUS FOR ADAPTING TO GASES OF DIFFERENT CALORIFIC VALUES IN THE SUPPLY OF GAS-AIR MIXTURE TO GAS ENGINES

FIELD OF THE INVENTION

The present invention relates to an apparatus used in supplying a gas-air mixture to gas engines which enables an adaptation to gases of different calorific values. A gas line having a gas pressure regulator and an air line discharge into a gas-air mixer, and a mixture line leads out of the mixer to the intake manifold of the gas engine.

BACKGROUND OF THE INVENTION

The gas-air mixers of gas engines, which are provided for all the cylinders in common, are conventionally designed such that the mixture ratio of air to gas, $\lambda v$, remains constant over the entire load range of the engine. If a gas with a different calorific value, for instance a higher calorific value, such as natural gas instead of sewage gas, is used, the result is that the gas with the higher calorific value also has a considerably greater air requirement. If the air quantity is not varied, then the calorific value of the mixture in the air-gas charge of a cylinder is virtually independent of the calorific value of the gas. Yet that means in turn that when a gas having a higher calorific value is used, the quantity of gas must be reduced at full load by a corresponding throttling in the gas pressure regulator. An optimal $\lambda v$ can thereby be attained for full load. Since a throttle of this kind becomes less and less effective as the load drops and hence with a decreasing quantity of gas per unit of time, $\lambda v$ then drops sharply in the partial-load range, in fact increasingly as the load decreases. The consequence is combustion at very high temperatures, perhaps in the vicinity of the knocking limit, and a sharp increase in nitric oxide emissions.

SUMMARY OF THE INVENTION

It is accordingly the object of the invention to devise an apparatus of the general type described above which makes it possible with simple means to operate at a favorable $\lambda v$ even in the event of changes in the calorific value of the gas used.

This object is attained in accordance with the invention by providing a bypass line having a throttle which leads from the air line to the mixture line, bypassing the gas-air mixer. The bypass line with the throttle comes into play only if a gas having a higher calorific value is used. At full load, the quantity of air flowing through the bypass line having the throttle is thus relatively small, because the cross section of the throttle is small in proportion to the cross section of the mixture line at the mixture valve. As the load drops, the mixture valve closes, so that the cross section of the throttle becomes relatively larger. Depending upon how large the throttle is adjusted to be at full load, it has a correspondingly more or less pronounced effect in the partial-load range.

Further advantages and features of the invention will become apparent from the ensuing detailed description of a preferred exemplary embodiment, taken in conjunction with the drawing.

BRIEF DESCRIPTION OF THE DRAWING

The sole FIGURE of the drawing is a schematic representation of an exemplary embodiment of the invention.

DESCRIPTION OF THE PREFERRED EMBODIMENT

Individual intake pipes 2 lead from an intake manifold 1 into the cylinders of a gas, i.e., gaseous-fuel, engine not otherwise shown. The intake manifold 1 is supplied with a gas-air mixture via a mixture line 3 from a gas-air mixer 4 which discharges the gas air mixture downstream into line 3, and a mixture valve 5 is disposed in the line 3 directly downstream of the mixer 4. The mixer 4 is supplied with air via an air line 6 and gas via a gas line 7 leading from a gas pressure regulator 8. This much of the design is conventional. From the air line 6, a bypass line 9 branches off upstream of the mixer 4 and leads into the mixture line 3 downstream of the mixture valve 5, bypassing the mixer 4. A throttle 10—as a rule, an adjustable throttle—is disposed in this bypass line 9, its flowthrough cross section being markedly smaller than the cross section of the mixture line 3 when the mixture valve 5 is fully open.

When a gas having a low calorific value, such as sewage gas, is used, the bypass line 9 is completely closed, either by the closure of the throttle or by the closure of some additional blocking device in the bypass line 9 which is not shown in the drawing. When this gas having a low calorific value is used, the mixer 4 functions in accordance with its setting, such that a predetermined $\lambda v$, which as a rule is constant over the load, is maintained.

When a gas having a higher calorific value, such as natural gas, is used, then on the one hand the gas pressure regulator 8 is adjusted such that by throttling of the gas, an optimal $\lambda v$ is attained at full load. On the other hand, the bypass line 9 is opened, so that with decreasing load, relatively more air flows through the throttle 10 and bypass line 9 into the mixture line 3 downstream of the mixture valve 5. As a result, the decreasing throttling effect in the gas pressure regulator 8 is compensated for, so that depending on how the throttle is adjusted it is possible to maintain a constant $\lambda v$ or a largely arbitrary course of $\lambda v$ over the load, even with a gas having a higher calorific value. It is even possible to provide that $\lambda v$ rises, or even drops, as the load decreases. The latter option is possible in particular if the adjustable throttle 10 is triggered on the part of the regulator 8, as is suggested by a control line 11 shown in dashed lines.

What is claimed is:

1. An apparatus for adapting to gases of different calorific values in the supply of gas-air mixture to gas engines, comprising a gas line having a gas pressure regulator and an air line discharge into gas-air mixer and a mixture line leading downstream from the mixer to the intake manifold of the gas engine, a mixture valve being disposed in the mixture line, and bypass means for supplying excess air to the intake manifold when the gas is of high caloric value and for preventing the supply of excess gas to the intake manifold when the gas is of low caloric value, said bypass means including a bypass line leading from the air line to the mixture line bypassing the gas-air mixer, and valve means in said bypass line to close said bypass line completely when the gas is of low caloric value and to maintain said bypass line open when the gas is of high caloric value, said valve means comprising a throttle disposed in said bypass line.

2. An apparatus as defined by claim 1, the throttle being adjustable.

3. An apparatus as defined by claim 1, wherein the bypass line discharges into the mixture line downstream of the mixture valve.

4. An apparatus as defined in claim 1, further comprising means to trigger the throttle by the gas pressure regulator.

* * * * *